United States Patent
Wilson et al.

(10) Patent No.: US 10,125,801 B2
(45) Date of Patent: Nov. 13, 2018

(54) LOCKING RETAINER FOR SLIDABLE SUPPORTS

(71) Applicant: ERICO INTERNATIONAL CORPORATION, Solon, OH (US)

(72) Inventors: Eric J. Wilson, Solon, OH (US); Raymond S. Laughlin, Middlefield, OH (US)

(73) Assignee: ERICO INTERNATIONAL CORPORATION, Solon, OH (US)

( * ) Notice: Subject to any disclaimer, the term of this patent is extended or adjusted under 35 U.S.C. 154(b) by 41 days.

(21) Appl. No.: 15/177,945

(22) Filed: Jun. 9, 2016

(65) Prior Publication Data

US 2016/0363149 A1  Dec. 15, 2016

Related U.S. Application Data

(60) Provisional application No. 62/174,084, filed on Jun. 11, 2015.

(51) Int. Cl.
- *F16B 2/24* (2006.01)
- *F16B 7/04* (2006.01)
- *F16B 7/10* (2006.01)

(52) U.S. Cl.
CPC ............. *F16B 7/105* (2013.01); *F16B 2/245* (2013.01); *F16B 7/042* (2013.01);
(Continued)

(58) Field of Classification Search
CPC ..... E04C 2003/0417; E04C 2003/0473; E04G 25/06; E04G 25/061; E04H 12/182;
(Continued)

(56) References Cited

U.S. PATENT DOCUMENTS 1,296,042 A * 3/1919 Braluve .................... F16B 7/00
                                                        403/379.2
1,891,740 A   12/1932 Westerman
(Continued)

FOREIGN PATENT DOCUMENTS

DE           10034592 C1    4/2002
DE      20201100276 A1 *    5/2011   ......... A63B 69/0028
(Continued)

OTHER PUBLICATIONS

Specification Translation of DE 10034592. Schroeder, Dieter. Height adjustment for telescopic tubes, for walking aids or invalid carriages and wheelchairs, has a spring clip at the outer tube with end cheeks to carry locking studs through the outer tube into the inner tube. Apr. 18, 2002.*

(Continued)

*Primary Examiner* — Josh Skroupa
(74) *Attorney, Agent, or Firm* — Quarles & Brady LLP

(57) ABSTRACT

A locking retainer can be used with a slidable support that includes a two support member with respective sets of locking apertures, with the two support members slidably engaging each other to define a support profile. A strap can at least partly bound an internal area and can support a locking pin that extends into the internal area. The strap can have a locking configuration in which, with the slidable support disposed within the internal area, the locking pin extends into two of the locking apertures to lock the slidable support at a fixed length. A locking retainer can be installed by disposing the slidable support within the internal area, aligning two locking apertures of the slidable support, and applying lateral pressure to a side arm of the locking retainer to seat a locking pin in the aligned locking apertures.

20 Claims, 12 Drawing Sheets

(52) U.S. Cl.
CPC .... *Y10T 24/44026* (2015.01); *Y10T 29/49947* (2015.01); *Y10T 403/32508* (2015.01); *Y10T 403/7077* (2015.01); *Y10T 403/7176* (2015.01)

(58) Field of Classification Search
CPC ........ F16B 2/245; F16B 7/042; F16B 7/0426; F16B 7/105; Y10T 24/44026; Y10T 29/49947; Y10T 403/32467; Y10T 403/32475; Y10T 403/32508; Y10T 403/7077; Y10T 403/7079; Y10T 403/7081; Y10T 403/7083; Y10T 403/7091; Y10T 403/7176
USPC ... 403/109.1, 109.2, 109.6, 377, 378, 379.1, 403/379.2, 379.6, 397; 29/525.01; 24/458
See application file for complete search history.

(56) References Cited

U.S. PATENT DOCUMENTS

| | | | |
|---|---|---|---|
| 3,024,031 A * | 3/1962 | Davidson | B25G 3/26 16/429 |
| 3,066,903 A | 12/1962 | Tinnerman | |
| 3,222,095 A | 12/1965 | Gerus | |
| 4,101,103 A | 7/1978 | Mooney et al. | |
| 4,329,078 A | 5/1982 | Crates et al. | |
| 4,391,428 A | 7/1983 | Grimes | |
| 4,494,296 A | 1/1985 | Grimes | |
| 4,958,792 A | 9/1990 | Rinderer | |
| 4,978,244 A * | 12/1990 | Lange | E04B 1/1903 285/397 |
| 5,240,032 A | 8/1993 | Mizioch | |
| 5,316,244 A | 5/1994 | Zetena, Jr. | |
| 5,533,696 A | 7/1996 | Laughlin et al. | |
| 5,593,115 A | 1/1997 | Lewis | |
| 5,876,000 A | 3/1999 | Ismert | |
| 6,086,029 A | 7/2000 | Oliver | |
| 6,198,047 B1 | 3/2001 | Barr | |
| 6,494,414 B2 | 12/2002 | Benito-Navazo | |
| 6,523,791 B2 | 2/2003 | Bernard et al. | |
| 6,889,943 B2 | 5/2005 | Dinh et al. | |
| 7,066,676 B2 * | 6/2006 | Tsai | E04H 15/50 135/142 |
| 7,090,174 B2 | 8/2006 | Korczak et al. | |
| 7,172,166 B2 * | 2/2007 | Wang | F16B 7/105 248/317 |
| 7,377,472 B2 | 5/2008 | Brown et al. | |
| 7,498,511 B1 | 3/2009 | Brown | |
| 7,774,889 B2 * | 8/2010 | Weaver | A47L 13/24 15/145 |
| 8,141,826 B1 | 3/2012 | Gallardo et al. | |
| 9,022,326 B2 | 5/2015 | Brown et al. | |
| 2010/0171012 A1 * | 7/2010 | Tseng | A47B 9/14 248/188.2 |
| 2013/0104494 A1 | 5/2013 | Evangelista et al. | |
| 2014/0260083 A1 | 9/2014 | Zhang et al. | |
| 2014/0283461 A1 | 9/2014 | Zhang et al. | |
| 2014/0283462 A1 | 9/2014 | Zhang et al. | |
| 2014/0283475 A1 | 9/2014 | Zhang et al. | |
| 2014/0283480 A1 | 9/2014 | Zhang et al. | |
| 2014/0283481 A1 | 9/2014 | Zhang et al. | |

FOREIGN PATENT DOCUMENTS

| | | | | |
|---|---|---|---|---|
| FR | 2408748 A1 | | 6/1979 | |
| FR | 2609776 A1 * | | 7/1988 | ............... A47B 9/06 |
| WO | WO 03049574 A1 * | | 6/2003 | ............... A47B 9/14 |

OTHER PUBLICATIONS

ERICO International Corporation [online] Copyright 2012; Telescoping Strut Replacement Bracket instruction sheet; 2 pages; retrieved from the internet; <https://www.erico.com/catalog/literature/CFS477.pdf>.

* cited by examiner

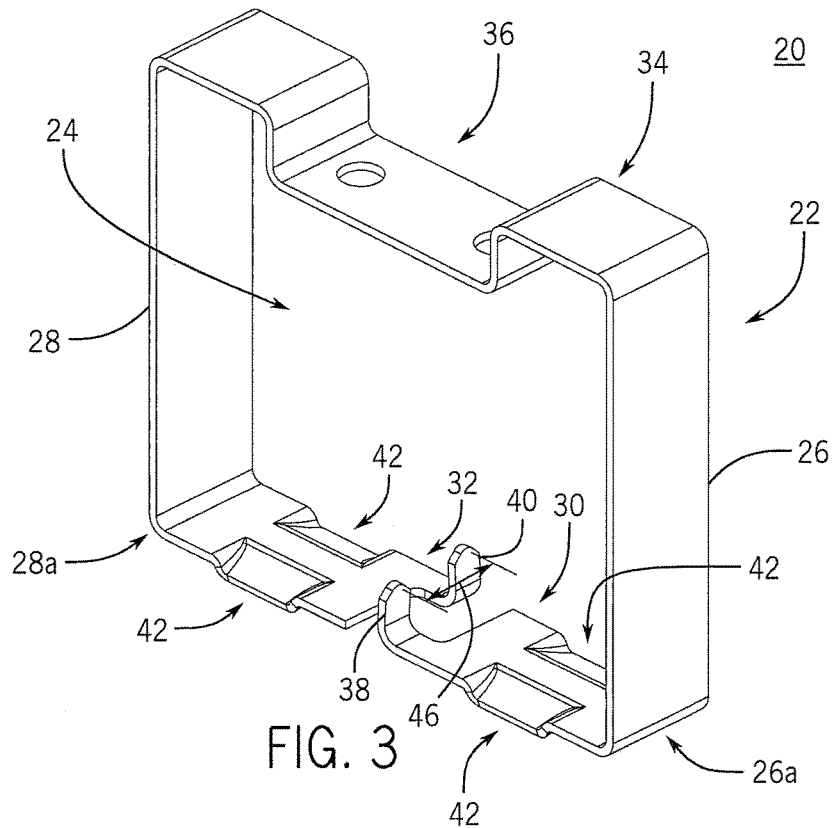
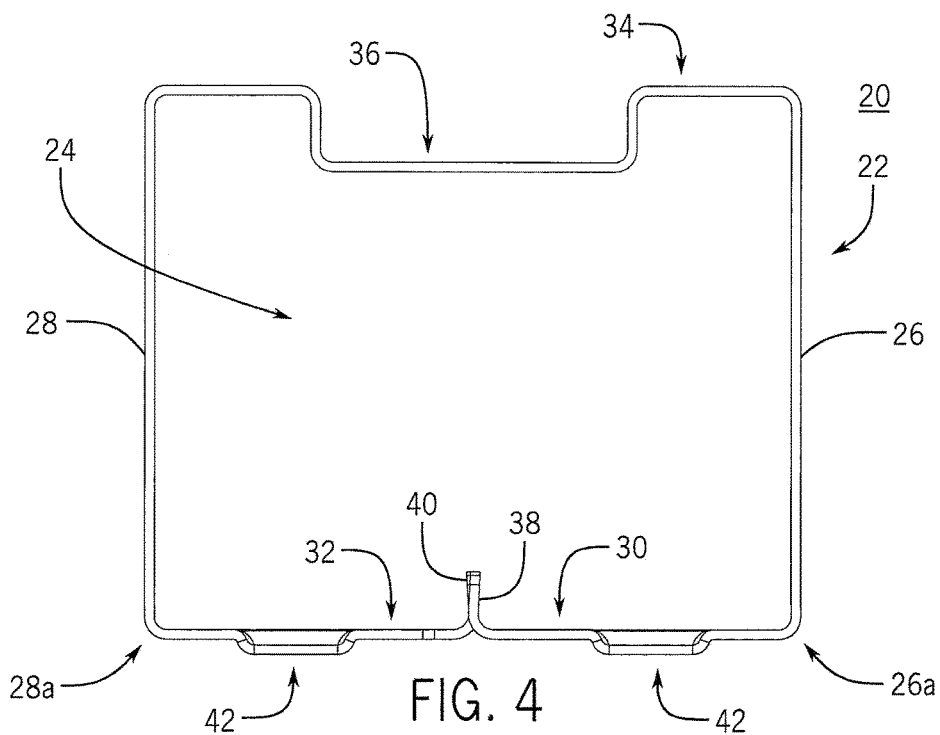

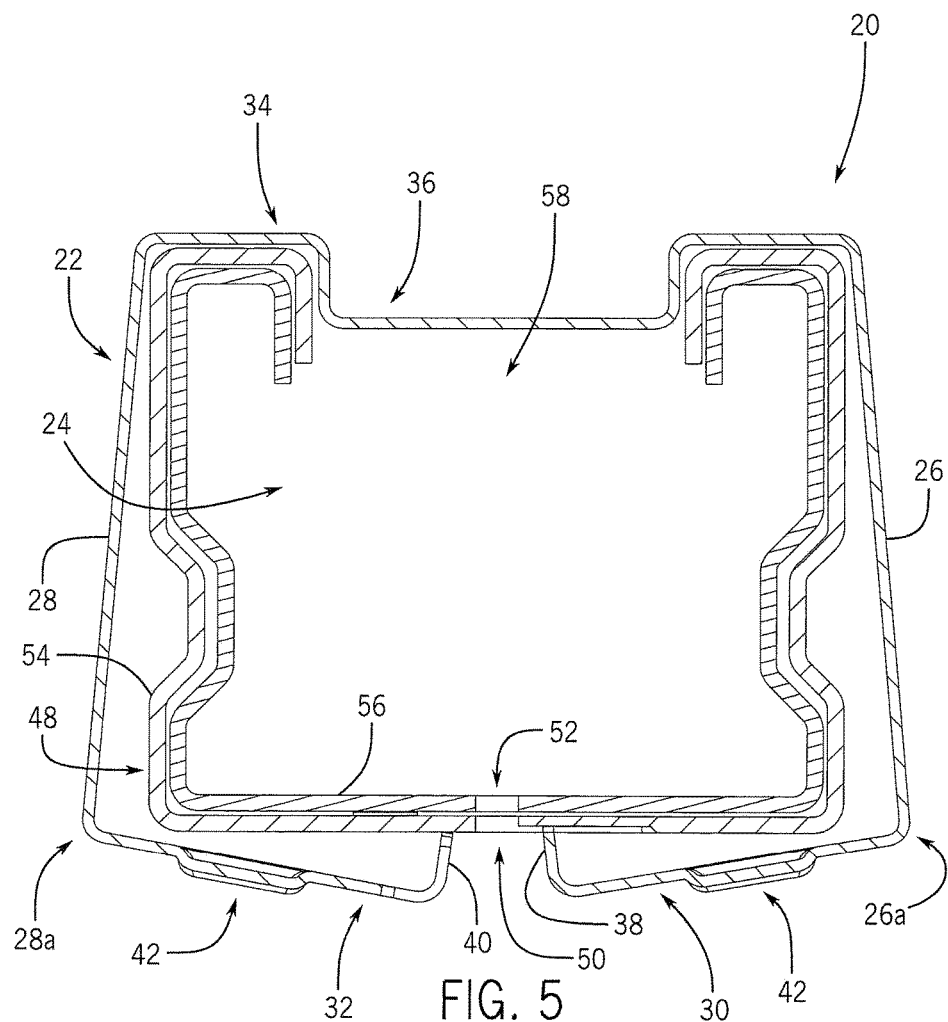

LOCKING RETAINER FOR SLIDABLE SUPPORTS

RELATED APPLICATIONS

This application claims priority to U.S. Provisional Patent Application No. 62/174,084, which was filed on Jun. 11, 2015.

BACKGROUND

Slidable structures can be useful to provide structural support over a range of lengths. For example, telescoping strut or other telescoping channels can allow workers to easily install trapeze or other support structures over a range of lengths. For ease of installation and other reasons, it can be useful to lock a slidable structure (e.g., a telescoping trapeze strut) at a particular length.

SUMMARY

Some embodiments of the invention provide a locking retainer for a slidable support that includes a first support member with first locking apertures and a second support member with second locking apertures, with the first support member and the second support member slidably engaging each other to define a support profile. A strap can at least partly bound an internal area and can include a first locking pin that extends into the internal area. The strap can have a locking configuration in which, with the slidable support disposed within the internal area, the first locking pin extends into one of the first locking apertures and one of the second locking apertures to lock the slidable support at a fixed length.

Some embodiments of the invention provide locking retainer for a slidable support that includes a first support member with first locking apertures and a second support member with second locking apertures, with the first support member and the second support member slidably engaging each other to define a support profile. A strap can at least partly bound an internal area and can include a first side arm, a second side arm, a linking portion connecting the first side arm to the second side arm, a first locking arm extending from the first side arm opposite the linking portion, a second locking arm extending from the second side arm opposite the linking portion, a first locking pin extending from the first locking arm into the internal area, and a second locking pin extending from the second locking arm into the internal area. The strap can have a locking configuration in which, with the slidable support within the internal area, the first locking pin extends into one of the first locking apertures and one of the second locking apertures, and the second locking pin extends into another of the first locking apertures and another of the second locking apertures, to lock the slidable support at a fixed length.

Some embodiments of the invention provide a method of installing a locking retainer on a slidable support, where the locking retainer has a strap that at least partly bounds an internal area and includes a first side arm, a first locking arm extending from the first side arm, and a first locking pin extending from the first locking arm into the internal area, and where the slidable support has a first support member with first locking apertures and a second support member with second locking apertures, with the first support member and the second support member slidably engaging each other to define a support profile. The slidable support can be disposed within the internal area. One of the first locking apertures can be aligned with one of the second locking apertures. Lateral pressure can be applied to the first side arm to seat the first locking pin in the first locking aperture and the second locking aperture to lock the slidable support at a fixed length.

DESCRIPTION OF THE DRAWINGS

FIG. 3 is a top, front, left isometric view of the locking retainer of FIG. 1 in a locking configuration;

FIG. 4 is a top, front, left isometric view of a second strap of the locking retainer of FIG. 1

FIG. 5 is a cross sectional view of the locking retainer of FIG. 1, in a staging configuration on a telescoping channel;

DETAILED DESCRIPTION

Figure 1:
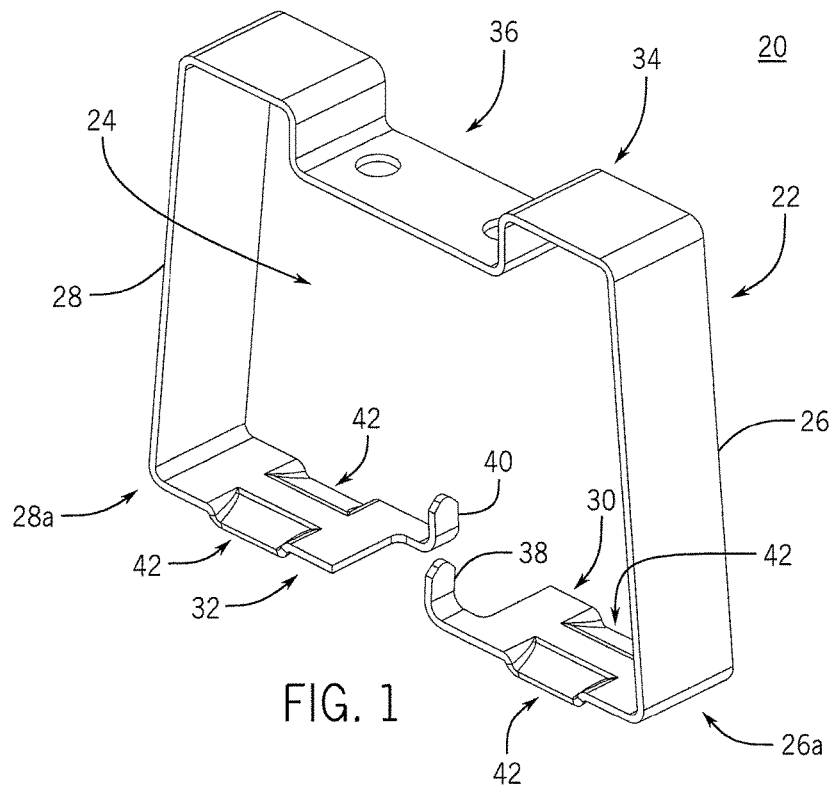
FIG. 1 is a top, front, left isometric view of a locking retainer according to one embodiment of the invention, with the locking retainer in a resting configuration.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein in the context of a slidable support, unless otherwise specified or limited, the term "axial" indicates a direction that is generally in parallel with a main sliding direction of the support. For example, where two trapeze struts are telescoped together, an axial movement is a movement generally in the direction that the struts slide relative to each other. Also as used herein in the context of a slidable support, unless otherwise defined or limited, the term "lateral" indicates a direction that is generally perpendicular with a main sliding direction of the support. For example, where two trapeze struts are telescoped together, a lateral movement is a movement generally in a direction perpendicular to the direction that the struts slide relative to each other.

Correspondingly, as used herein, two (or more) features are in "axial" alignment when the features are substantially disposed along a single axially-extending reference line. For example, a series of locking apertures arranged axially along an axial centerline of a wall of a slidable support are generally axially aligned. Similarly, as used herein, two (or more) features are in "lateral" alignment when the features are substantially disposed along a single laterally-extending reference line. For example, features arranged laterally along a reference line perpendicular to the above-noted axial centerline are generally laterally aligned. In this light, it will be understood that some features can be laterally aligned while also being axially offset, or vice versa. Further, some features can be both laterally and axially offset, in which arrangement the features are separated from each other the both an axial direction and a lateral direction.

Also as used herein, unless otherwise specified or limited, the term "u-shaped" specifies a shape that includes a base portion, with at least two leg portions extending in generally similar directions from the base portion. In some embodiments, a "u-shaped" member can include leg portions extending from opposite ends of the base portion at substantially right angles to the base portion, with or without curved, chamfered, or otherwise non-square connecting regions between the leg portions and the base portion.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Generally, locking retainers according to the invention can be used to secure telescoping channels, or other slidable supports, at a fixed length. In some embodiments, a locking retainer can include a strap that wraps around part or all of a telescoping support in order to provide structural support for the support, as well as lock the support at a desired length. In some embodiments, a locking retainer can include inwardly extending pins that can engage apertures on support members of a telescoping support to lock the support members against sliding. In some embodiments, the inwardly extending pins can be laterally and axially offset when the locking retainer is in a resting configuration, and can be axially offset but laterally aligned when the locking retainer is in a locking configuration.

In some of the discussion herein, embodiments of the invention are discussed in the context of telescoping channels for trapeze supports. This context is presented as an example only. Generally, embodiments of the invention can be used with a variety of slidable supports. Likewise, materials and manufacturing methods discussed herein are provided as examples only.

FIGS. 1 through 4 illustrate a locking retainer 20 according to one embodiment of the invention. The locking retainer 20 is formed as a unitary stamped metal (e.g., spring steel) strap 22 that bounds an internal area 24. The strap 22 includes side arms 26 and 28, each of which transitions at a respective bend 26a and 28b, to locking arms 30 and 32. Opposite the locking arms 30 and 32, the side arms 26 and 28 are connected by a linking portion 34 of the strap 22.

In some installations, as also discussed below, the locking retainer 20 can be used with strut or other supports with open sides (e.g., with struts configured as open channels). In some embodiments, a locking retainer can be provided with one or more features that extend into one or more side openings (e.g. a top slot) of a relevant support. This can be useful, for example, in order to help secure the locking retainer to the support, or to brace the support internally to improve its overall strength. To this end, in the locking retainer 20, the linking portion 34 includes a brace portion 36 that extends generally into the internal area 24.

Figure 2:
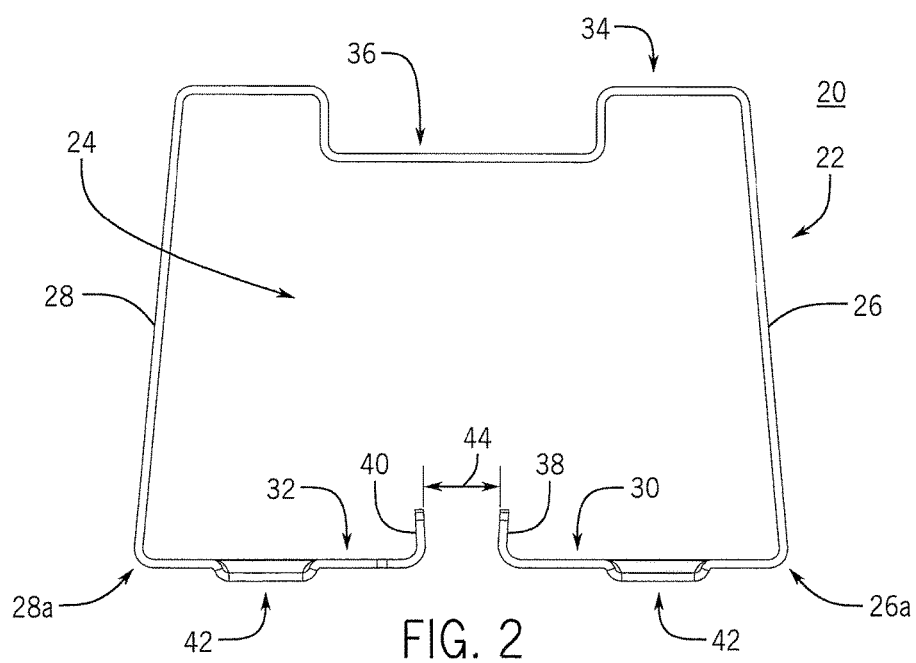
FIG. 2 is a front elevation view of the locking retainer of FIG. 1.

To help engage a slidable support, locking pins 38 and 40 extend generally into the internal area 24 from respective free ends of the locking arms 30 and 32. As a product of a stamping process that can be used to manufacture the locking retainer 20, the locking pins 38 and 40 can be formed as illustrated, with a generally flattened profile and generally rounded corners. In other embodiments, other profiles and features are possible. As illustrated in FIGS. 2 and 4 in particular, the locking pins 38 and 40 can be formed with a non-square (e.g., acute) resting angle relative to the respective locking arms 30 and 32. This can be useful, for example, to help retain the locking pins 38 and 40 within appropriate locking apertures (as also discussed below). In other embodiments, however, other configurations are possible.

As also illustrated in FIGS. 1 through 4, a set of tabs 42 extend from the side arms 26 and 28 generally away from the internal area 24. As also described below, these tabs can be useful as engagement features for tools. In the locking retainer 20, for example, the tabs 42 are configured as flattened louvers, with ramped inner and outer surfaces, as may usefully engage a flathead screwdriver or similar other tool. In other embodiments, other geometries for tool-engaging feature can be used. Likewise, in other embodiments, a locking retainer can include a different number or spatial arrangement of the tabs 42 (or other engagement features).

FIGS. 1 and 2 illustrate the locking retainer 20 in a resting configuration (i.e., in an adopted or maintained shape in the absence of significant external forces). In the resting configuration, the side arms 26 and 28 extend away from the linking portion 34 at respective (e.g., equal) obtuse angles. Likewise, each of the locking arms 30 and 32 extends away from the respective side arm 26 or 28 at respective (e.g., equal) acute angles. Accordingly, the internal area 24 is generally trapezoidal, aside from the inward protrusion defined by the brace portion 36. In some embodiments, a width of the top of the strap 22 can be substantially equal to an expected width of a slidable support (e.g., a standard width for a telescoping trapeze strut).

Also in the resting configuration, the locking pins 38 and 40 are both laterally and axially offset from each other. In the locking retainer 20, the locking pins 38 and 40 are laterally separated by a distance 44 (see FIG. 2) that is geometrically determined by the angle of the side arms 26 and 28, as also discussed below. The locking pins 38 and 40 are axially separated by a distance 46 (see FIG. 3) that is less than a width of the strap 22 in the axial direction (i.e., less than an axial width of the strap 22). In other embodiments, other separation distances are possible.

FIGS. 3 and 4 illustrate the locking retainer 20 in a locking configuration, as may be useful for locking a slidable support at a desired length. In the locking configuration, the side arms 26 and 28 have been elastically flexed (e.g., bent) inwards from their orientation in FIGS. 1 and 2, thereby reducing the size of the internal area 24 and reshaping it generally into a rectangular area. With the side arms 26 and 28 thus disposed, the locking pins 38 and 40 are generally aligned axially, while still being laterally offset from each other. As such, as also noted below, an appropriate magnitude for the separation distance 44 can be determined based on the length of the side arms 26 and 28, and the angle between the side arms 26 and 28 and the linking portion, when the locking retainer 20 is in the resting configuration.

As noted above, the locking retainer 20 can be placed in the locking configuration in order to lock a slidable support at a desired length. In the embodiment illustrated in FIGS. 3 and 4, the locking configuration of the locking retainer 20 corresponds to a generally slidable support with a generally rectangular profile (not shown in FIGS. 3 and 4). As such, the locking retainer 20 is illustrated in FIGS. 3 and 4 with the locking arms 30 and 32 at generally right angles relative to the side arms 26 and 28. Without a slidable support (or other structure) within the internal area 24, the locking arms 30 and 32 may generally remain at an acute angle relative to the side arms 26 and 28, even as the side arms 26 and 28 are bent inwards or otherwise deformed. In other embodiments, a locking configuration can exhibit other shapes, as may be appropriate for a particular slidable support.

In some configurations, a locking retainer can be configured to be staged on a relevant slidable support prior to the locking retainer being used to lock the support at a particular length. For example, FIG. 5 illustrates the locking retainer 20 staged on a telescoping trapeze strut 48, before the locking retainer 20 is used to lock the trapeze strut 48 at a desired length. In the illustrated staged configuration, the trapeze strut 48 has been inserted (e.g., stabbed) into the internal area 24, with the locking pins 38 and 40 seated on an outer surface of the trapeze strut 48 (e.g., a bottom, outer surface of an outer trapeze member 54) rather than being inserted into locking apertures 50 and 52 of the trapeze strut 48. Generally, the side arms 26 and 28 are approximately the same length as a height of the trapeze strut 48, so that the strap 22 can seat relatively snugly around the outer profile of the trapeze strut 48 when the locking retainer 20 is in the locking configuration (as also discussed below). As such, when the locking pins 38 and 40 are seated on the outer surface of the trapeze strut 48, the side arms 26 and 28 are generally urged to pivot outwards. The resulting elastic response from the side arms 26 and 28 (and the strap 22, generally) can urge the locking pins 38 and 40 firmly towards the outer surface, so that the locking retainer 20 is generally help in place.

Placing the locking retainer 20 in the staging configuration illustrated in FIG. 5 can be useful, for example, in order to help a worker to carry the trapeze strut 48 for installation without loose hardware. Further, because the locking pins 38 and 40 are urged into contact with the outer trapeze member 54 but not an inner trapeze member 56, the locking retainer 20 can remain staged on the trapeze strut 48 even while the inner trapeze member 56 is slid relative to the outer trapeze member 54 to move the trapeze strut 48 to a desired length.

When the locking retainer 20 is in the staging configuration relative to the trapeze strut 48, the brace portion 36 of the strap 22 extends into an opening 58 (e.g., an open-ended slot) on the trapeze strut. As also noted above, the brace portion 36 can be configured to fit relatively snugly into the opening 58 (e.g., with somewhat of a press fit engagement). This can be useful, for example, once the trapeze strut 48 is loaded, to help increase the lateral strength of the strut 48, and generally protect the trapeze strut 48 from inward buckling.

In contrast to the trapeze strut 48, some slidable supports may not include openings similar to the opening 58. Accordingly, in some embodiments, a locking retainer can include a bracing portion with a different geometry than the bracing portion 36, or can include no bracing portion that extends into a profile of the relevant support.

Figure 6:
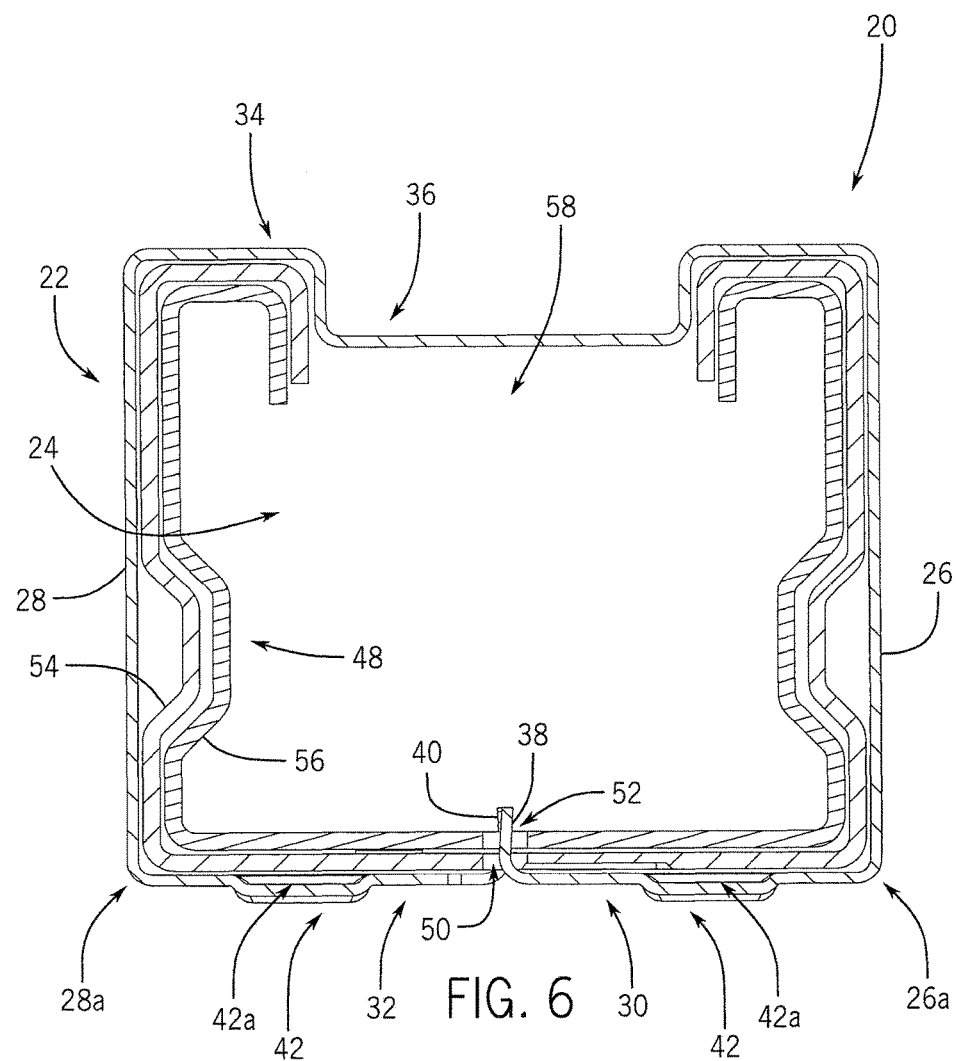
FIG. 6 is a cross sectional view of the locking retainer of FIG. 1, in a locking configuration, with the telescoping channel.
Figure 7:
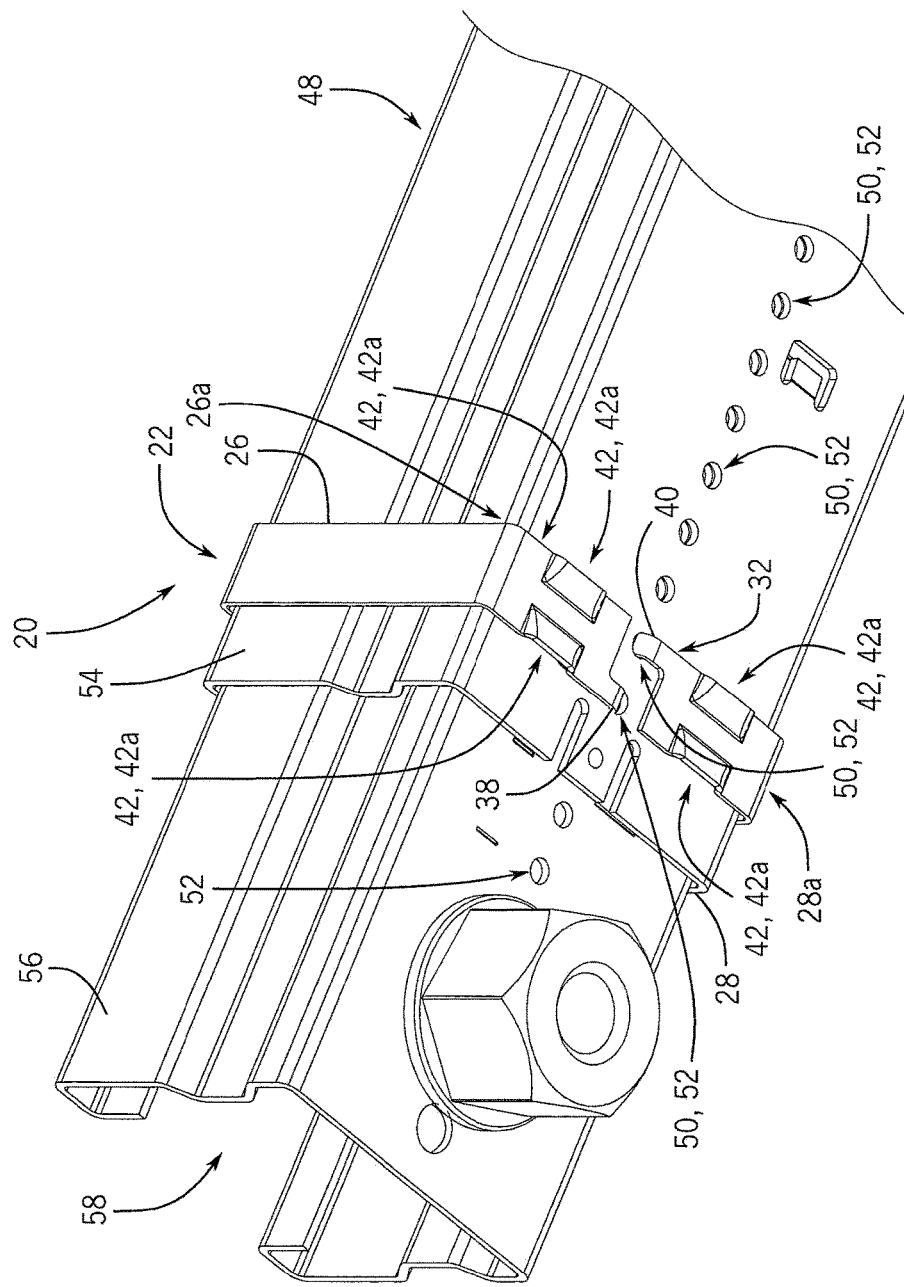
FIG. 7 is a bottom, front, right isometric view of the locking retainer of FIG. 1, in the locking configuration, with the telescoping channel.

FIGS. 6 and 7 illustrate the locking retainer 20 in a locking configuration relative to the trapeze strut 48, with the trapeze strut 48 at a length for which at least two of the locking apertures 50 are aligned with at least two of the locking apertures 52. In the embodiment illustrated, the locking apertures 50 and 52 are arranged in respective axially extending arrays, which arrays are laterally aligned with each other when the inner trapeze member 56 is slidably nested within the outer trapeze member 54. Accordingly, the trapeze member 48 can be generally disposed at a variety of lockable lengths by sliding the inner trapeze member 56 relative to the outer trapeze member 54 to align a particular pair of the locking apertures 50 with a particular pair of the locking apertures 52.

To move the locking retainer 20 from the staging configuration illustrated in FIG. 5 to the locking configuration illustrated in FIGS. 6 and 7, the side arms 26 and 28 can be urged inwards until the side arms 26 and 28 are generally proximate to (e.g., seated against) opposite sides of outer trapeze member 54. Correspondingly and simultaneously, the locking pins 38 and 40 can be moved laterally to extend into the two aligned pairs of the locking apertures 50 and 52, so that the locking pins 38 and 40 block the inner trapeze member 56 and the outer trapeze member 54 from sliding relative to each other.

As noted above, with the locking retainer 20 in a resting configuration, the locking aims 30 and 32 extend from the side arms 26 and 28 at acute angles. As illustrated in FIGS. 4 and 6 in particular, with the locking retainer in a locking configuration, the locking arms 30 and 32 extend from the side arms 26 and 28 at substantially right angles. The elastic response of the strap 22 to this change in orientation can urge the locking arms 30 and 32 to pivot generally upwards at the bends 26a and 28a. Accordingly, with such pivoting blocked by the structure of the trapeze strut 48, the locking pins 38 and 40 can be naturally urged to remain in place within the aligned locking apertures 50 and 52.

With the locking retainer 20 in the locking configuration, the brace portion 36 continues to extend into the opening 58 in trapeze strut 48. As noted above, this can be useful, for example, to internally brace the slidable support and thereby increase its lateral strength. Additionally, because the locking pins 38 and 40 have been moved into substantial axial alignment, the strap 22 extends fully around the trapeze strut 48, with the side arms 26 and 28 seated firmly against opposite sides of the outer trapeze member 54, and the locking aims 30 and 32 seated firmly against the outer trapeze member 56 opposite the opening 58. This can generally provide additional structural support for the trapeze strut 48.

With the locking retainer 20 in the locking configuration, the tabs 42 extend generally away from the outer trapeze member 56, such that spaces 42a are provided between the tabs 42 and the outer trapeze member 56. In order to remove the locking retainer 20 from the locking configuration, a flat-head screwdriver or similar tool can be inserted into select ones of the spaces 42a and used to pry the corresponding locking pin 38 or 40 out of the respective set of locking apertures 50 and 52.

In the embodiment illustrated, the locking apertures 50 and 52 of the trapeze strut 48 extend into the aligned sets of the locking apertures 50 and 52 and fully through the outer trapeze member 54 and the inner trapeze member 56, respectively. In other embodiments, other arrangements are possible. For example, a set of apertures on an inner support member of a slidable support may be configured as set of blind holes, indents, or depressions rather than holes extending fully through the inner support member.

Figure 8:
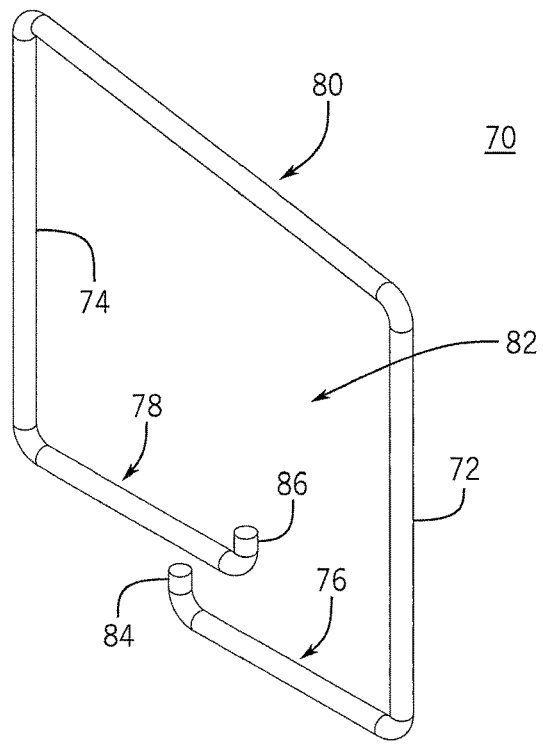
FIG. 8 is a top, front, right isometric view of a locking retainer according to another embodiment of the invention.

FIG. 8 illustrates a locking retainer 70 according to one embodiment of the invention. Generally, the locking retainer 70 is similar to the locking retainer 20. For example, the locking retainer 70 includes side arms 72 and 74, locking arms 76 and 78, and a linking portion 80, that are configured to define a generally trapezoidal internal area 82 when in a resting configuration (e.g., as illustrated in FIG. 8), and a generally rectangular internal area when in a locking configuration (not shown). Also similarly to the locking retainer 70, locking pins 84 and 86 that are axially and laterally offset in a resting configuration extend into the internal area 82 from ends of the locking arms 76 and 78. In a locking configuration (not shown), the locking pins 84 and 86 can be moved into lateral alignment, while remaining axially offset. In contrast to the locking retainer 20, the locking retainer 70 is a unitary wire-form part and does not include an inwardly extending brace portion similar to the brace portion 36. This may be useful, for example, in order to accommodate slidable supports without openings similar to the opening 58 of the trapeze strut 48 (see, e.g., FIG. 6), or to allow for relatively low cost and high speed manufacturing.

Figure 9:
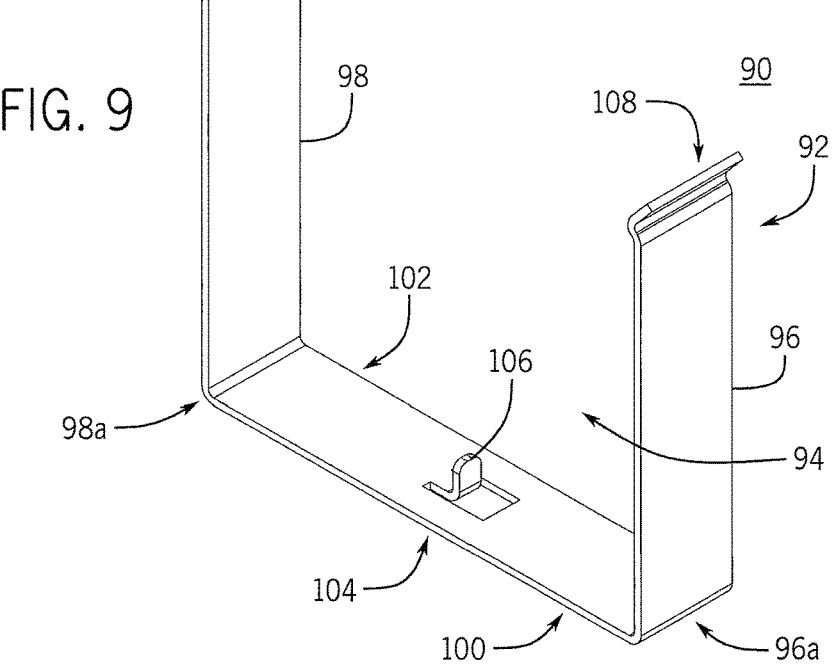
FIG. 9 is a top, front, right isometric view of a locking retainer according to yet another embodiment of the invention.

In some embodiments, it can be useful to configure a locking retainer as a strap with other external profiles. For example, FIG. 9 illustrates a locking retainer 90 according to one embodiment of the invention. Generally, the locking retainer 90 is formed as a unitary stamped metal (e.g., spring steel) strap 92 that bounds a generally rectangular internal area 94. The strap 92 includes side arms 96 and 98, each of which transitions at a respective bend 96a and 98a, to locking arms 100 and 102. In the embodiment illustrated in FIG. 9, the locking arms 100 and 102 connect via a linking portion 104 so that the strap 92 defines a generally u-shaped profile, and the generally rectangular internal area 94.

Generally, an arrangement of one or more locking pins can be provided on the linking portion 104 to engage aligned sets of locking apertures when a slidable support is inserted into the internal area 94 (e.g., from an end of the strap 92 opposite the linking portion 104). In the embodiment illustrated, the locking retainer 70 includes a single locking pin 106. In other embodiments, multiple locking pins are possible, including arrays of laterally aligned and axially offset (or otherwise arranged) locking pins.

Figure 10:
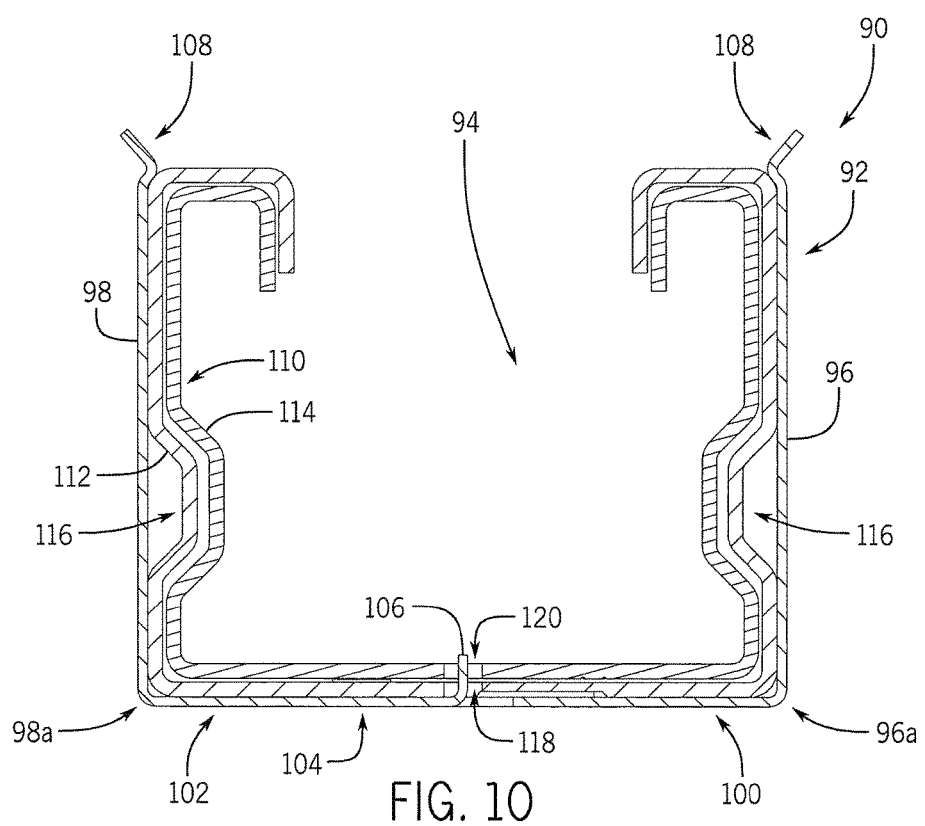
FIG. 10 is a cross sectional view of the locking retainer of FIG. 9, in a locking configuration, with a telescoping channel.
Figure 11:
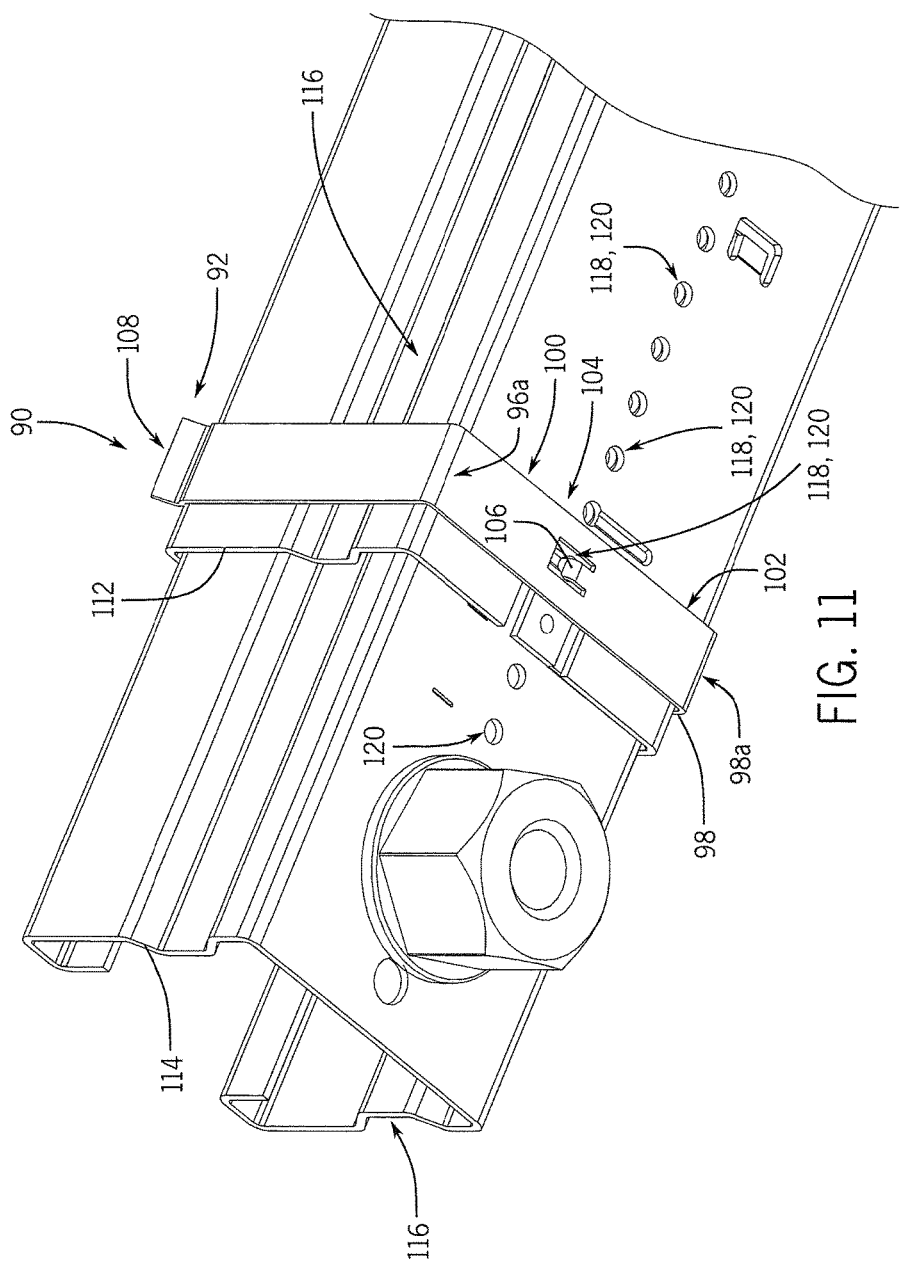
FIG. 11 is a bottom, front, right isometric view of they locking retainer of FIG. 9, in the locking configuration, with the telescoping channel.

To help retain the locking retainer 90 on a slidable support without the inclusion of a linking portion opposite the locking pin 106, free ends of the side arms 96 and 98 include inwardly angled catches 108. As illustrated in FIGS. 10 and 11, when the locking retainer 90 is seated on a telescoping trapeze strut 110, with the locking pin 106 extending through locking apertures 118 and 120 to lock outer and inner trapeze members 112 and 114 of the trapeze strut 110 against relative sliding motion, the catches 108 engage upper edges of the side walls of the outer trapeze member 112 to hold the locking retainer 90 in place on the trapeze strut 110.

In some embodiments, the catches 108 can also help to hold the locking retainer 90 in a staging configuration. For example, the catches 108 can be sized to engage grooves 116 along the outside of the outer member 112 (or other features of the trapeze strut 110), in order to secure the locking retainer 90 to the trapeze strut 110 while still allowing the length of the trapeze strut 110 to be adjusted. In some embodiments, the side arms 96 and 98 can be somewhat shorter than the length illustrated in FIGS. 9 through 11, so that the catches 108 can engage the grooves 116 (or other features), in order to secure the locking retainer 90 in a locking configuration rather than (or in addition to) a staging configuration.

Figure 12:
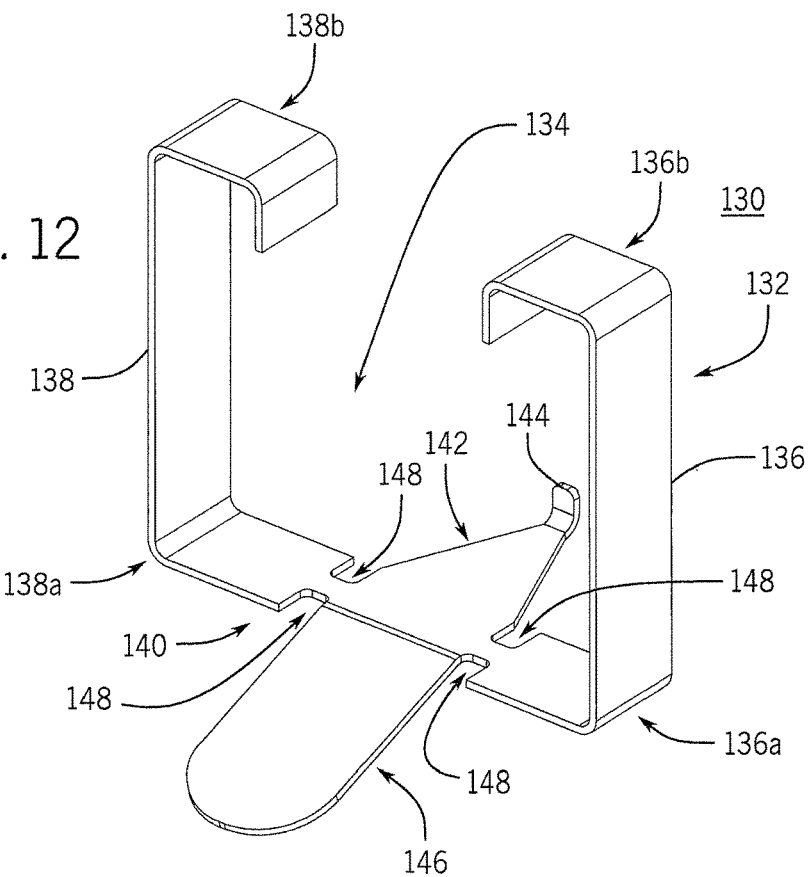
FIG. 12 is a top, front, right isometric view of a locking retainer according to still another embodiment of the invention.

As also noted above, it can be useful to provide release tabs to help remove a locking retainer from a locking configuration. In some embodiments, it can be useful to provide release tabs that are configured differently from the louver tabs 42 (see, e.g., FIG. 1). For example, FIG. 12 illustrates a locking retainer 130 according to one embodiment of the invention. Generally, the locking retainer 130 is formed as a unitary stamped metal (e.g., spring steel) strap 132 that bounds a generally rectangular internal area 134. The strap 132 includes side arms 136 and 138, each of which transitions at a respective bend 136a and 138a to a linking portion 140 to define a generally u-shaped profile. At respective free ends, the side arms 136 and 138 are bent to form reentrant lips 136b and 138b, which can be formed to engage features on a particular slidable support (e.g., lips of an extended slot). In the embodiment illustrated, the reentrant lips 136b and 138b are generally square-profile lips. In other embodiments, other configurations (e.g., other geometric profiles) are possible.

Substantially aligned with an axial centerline of the linking portion 140, the strap 132 includes a tapered locking arm 142 that extends generally axially in one direction. A locking pin 144 is disposed at a free end of the locking arm 142, and extends generally inwards relative to the rectangular area 134. Generally opposite the locking arm 142, the strap 132 includes a release tab 146, which extends axially in an opposite direction from the locking arm 142 and generally angles away from a plane defined by the linking portion 140 and the locking arm 142. Near the locking arm 142 and the release tab 146, the material of the linking portion 140 is thinned at axially extending cutouts 148.

Figure 13:
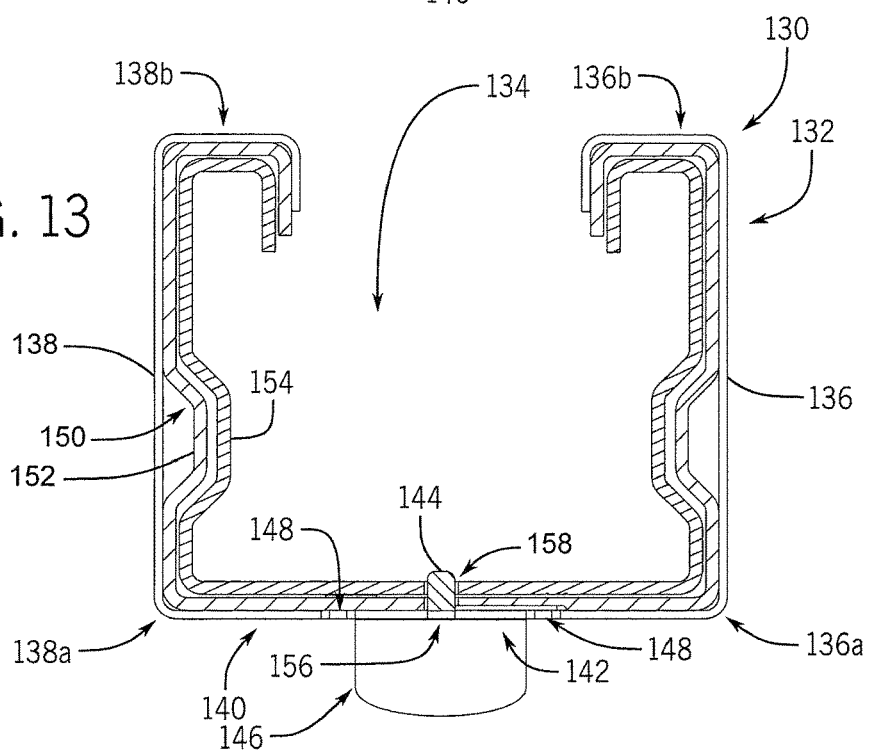
FIG. 13 is a cross sectional view of the locking retainer of FIG. 12, in a locking configuration, with a telescoping channel.
Figure 14:
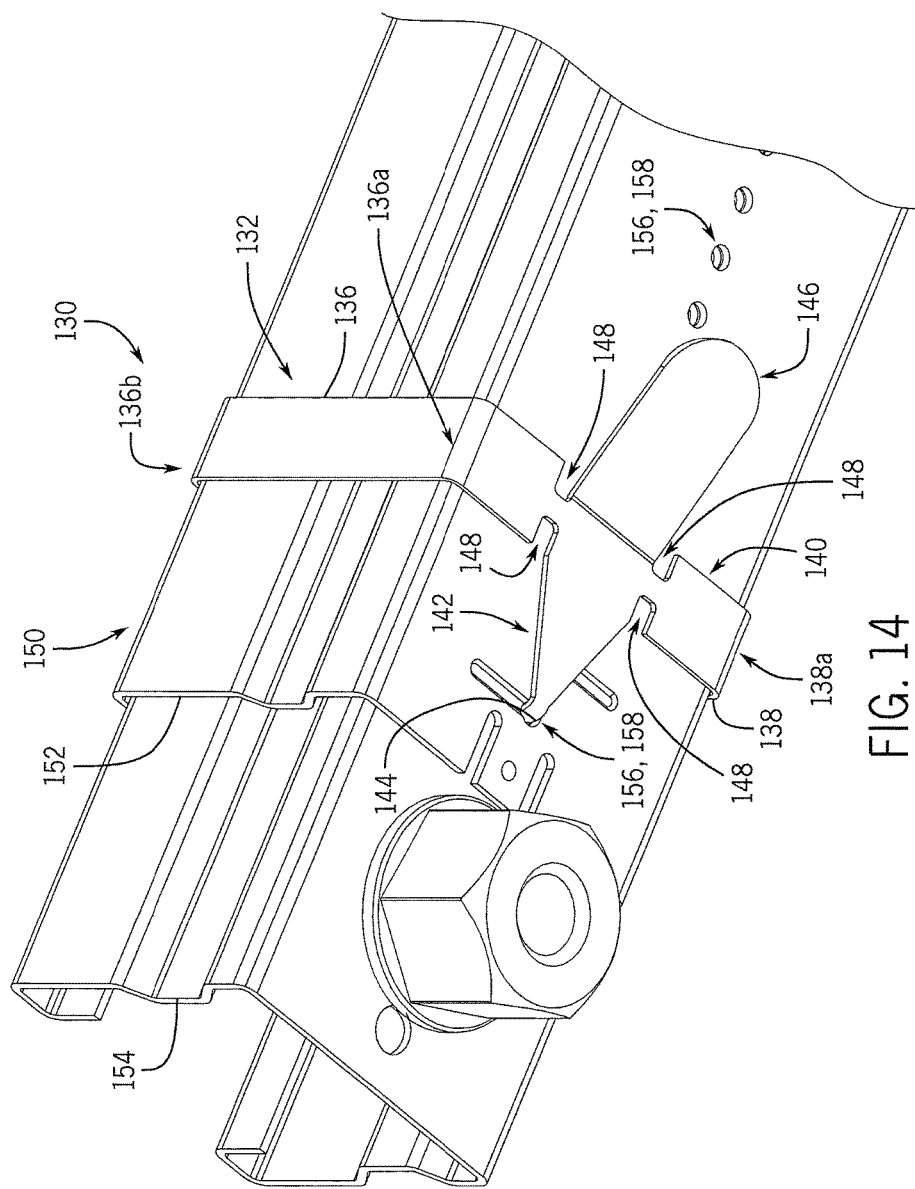
FIG. 14 is a bottom, front, right isometric view of the locking retainer of FIG. 12, in the locking engagement, with the telescoping channel.

As illustrated in FIGS. 13 and 14, when the locking retainer 130 is seated on a telescoping trapeze strut 150 in a locking configuration, the locking pin 144 can extend into aligned locking apertures 156 and 158 on outer and inner trapeze members 152 and 154 of the trapeze strut 150 to lock the trapeze strut 150 at a desired length. In the embodiment illustrated, the locking pin 144 extends through an instance of the locking apertures 156 that is configured as an elongate slot, rather than a rounded hole. In other embodiments, other configurations are possible.

With the locking retainer 130 in the locking configuration, the reentrant lips 136b and 138b are seated on nested, reentrant upper lips of the trapeze strut 150. Also with the locking retainer 130 in the locking configuration, the release tab 146 angles generally away from the outer surface of the outer trapeze member 152. When a worker applies appropriate pressure on the release tab 146 (e.g., using a mallet or hammer), the strap 132 can accordingly deform (e.g., twist) at the cutouts 148 to pivot the locking arm 142 away from the outer trapeze member 152 and thereby unlock the trapeze strut 150.

Figure 15:
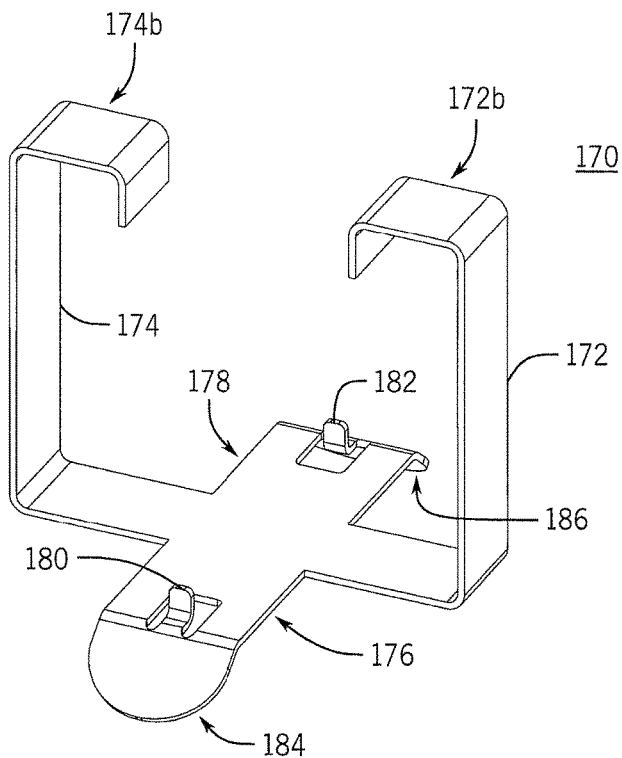
FIG. 15 is a top, front, right isometric view of a locking retainer according to a further embodiment of the invention.

FIG. 15 illustrates a locking retainer 170 with a generally u-shaped profile, and with side arms 172 and 174 ending in reentrant lips 172b and 174b similarly to the side arms 136 and 138 of the locking retainer 130 (see, e.g., FIG. 12). Substantially laterally aligned with an axial centerline of the locking retainer 170, locking arms 176 and 178 extend in axially opposite directions towards locking pins 180 and 182, respectively. Along respective bend lines that are generally axially aligned with the attached ends of the stamped locking pins 180 and 182, the locking arms 176 and 178 transition to outwardly angling release tabs 184 and 186.

Figure 16:
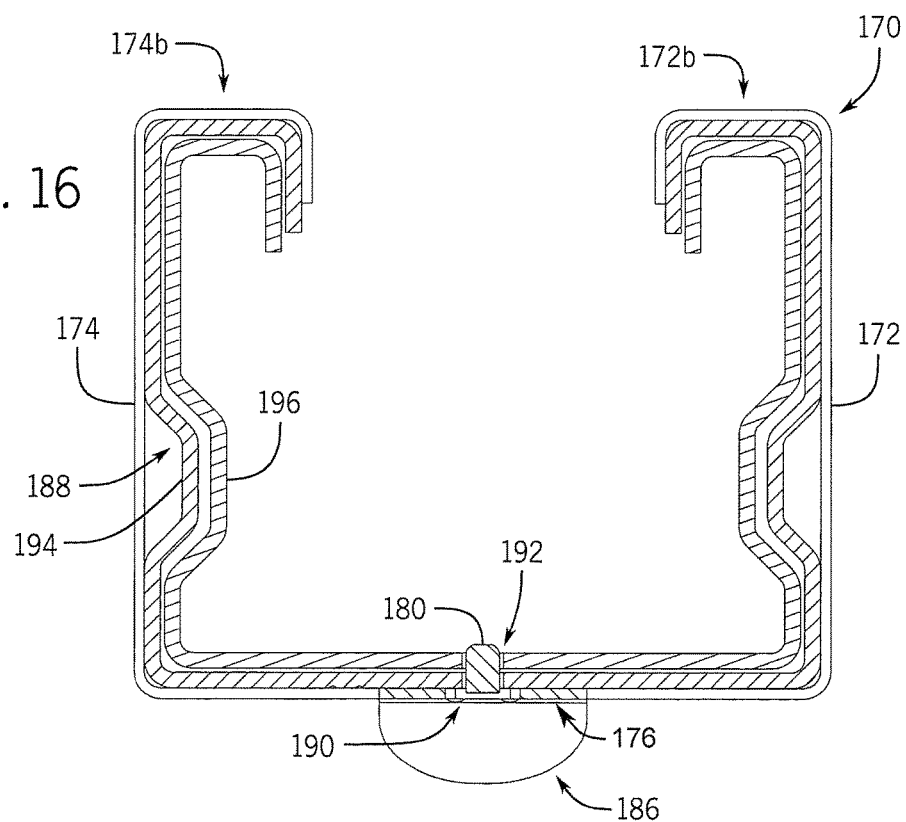
FIG. 16 is a cross sectional view of the locking retainer of FIG. 15, in a locking configuration, with a telescoping channel.
Figure 17:
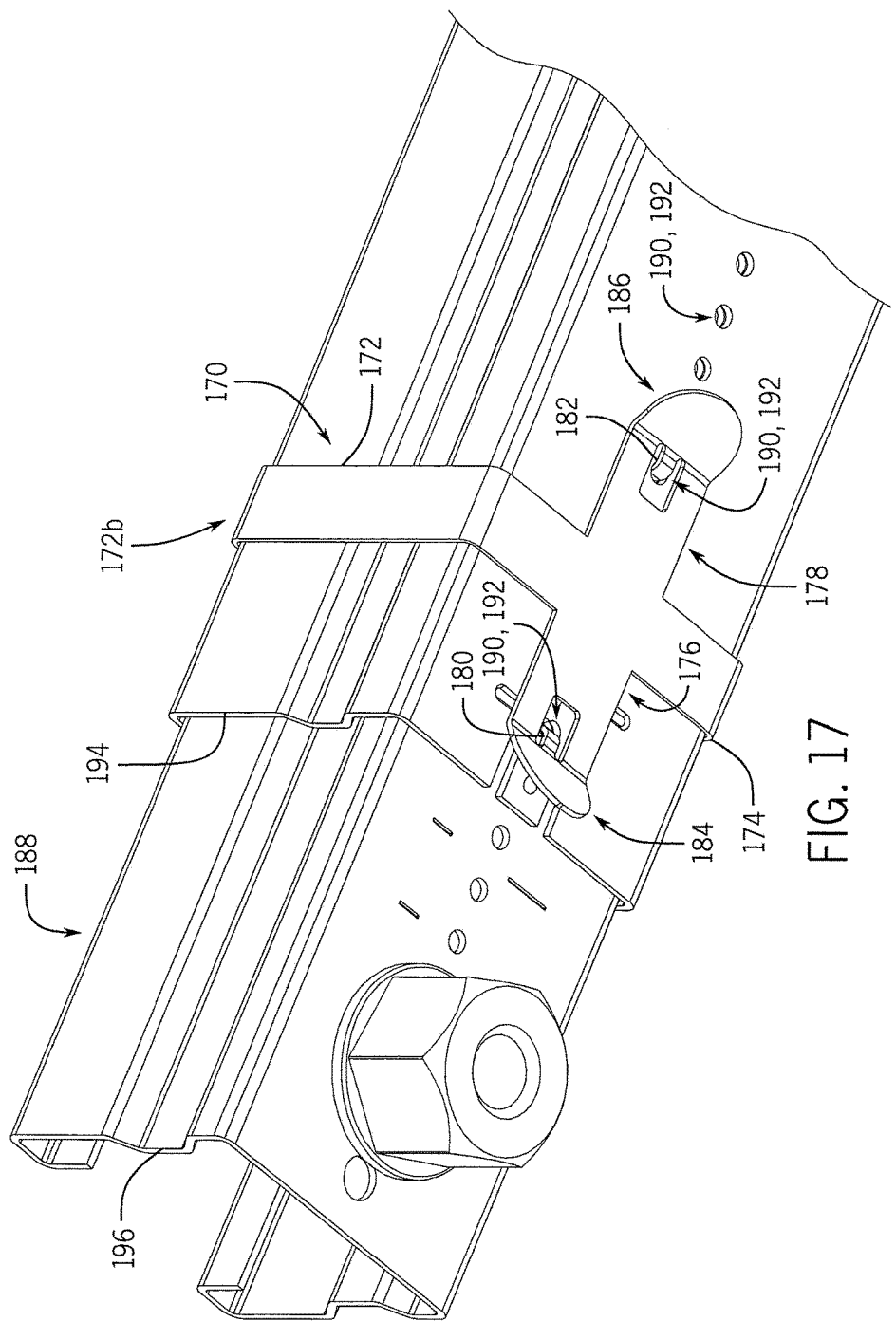
FIG. 17 is a bottom, front, right isometric view of the locking retainer of FIG. 15, in the locking configuration, with the telescoping channel.

As illustrated in FIGS. 16 and 17, when the locking retainer 170 is seated on a telescoping trapeze strut 188 in a locking configuration, the reentrant lips 176a and 178b are seated on nested, reentrant upper lips of the trapeze strut 188, and the locking pins 180 and 182 extend into aligned sets of locking apertures 190 and 192 on outer and inner trapeze members 194 and 196 of the trapeze strut 188 to lock the trapeze strut 188 at a desired length. With the locking retainer 170 in the locking configuration, the release tabs 184 and 186 angle generally away from the outer surface of the outer trapeze member 194. When a worker applies appropriate pressure on the release tabs 184 and 186 (e.g., using a screwdrivers or pliers to pry the release tabs 184 and 186 away from the trapeze strut 150), the locking arms 176 and 178 can be bent away from the outer trapeze member 194 and thereby remove the locking pins 180 and 182 from the locking apertures 190 and 192 to unlock the trapeze strut 188.

Various embodiments of a locking retainer are discussed above and illustrated in the figures. In other embodiments, different arrangements of features, including different combinations of the features illustrated in FIGS. 1 through 17 are possible. For example, embodiments of the locking retainer can include re-entrant lips to engage a slidable support, including for configurations similar to those illustrated in the figures without re-entrant lips (e.g., the locking retainer 90 of FIG. 9). In some embodiments, different numbers and arrangements of locking pins, different numbers and arrangements of locking arms, and different relative relationship of locking pins to locking arms can be used. In some embodiments, locking pins can be configured to engage non-circular locking apertures on a slidable support, or to engage locking apertures that are not necessarily arranged in an axially-extending, regular array. In some embodiments, cutouts similar in function to the cutouts 148 (see, e.g., FIG. 12), but potentially different in form from the cutouts 148, can be used. For example, in some embodiments, a locking retainer similar to the locking retainer 170 (see, e.g., FIG. 15) can include cutouts similar to the cutouts 148 to facilitate bending of locking arms similar to the locking arms 176 and 178.

The locking retainers 20, 70, 130, and 170 described herein, as well as other locking retainers designed or manufactured according to the invention, can provide various improvements over conventional locking retainer designs. In some embodiments, for example, the disclosed locking retainers 20, 70, 130, and 170 can allow workers to relatively easily lock a slidable support at a desired length, without the need for a substantial number of loose hardware or specialized tools.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features of the invention are set forth in the following claims.

The invention claimed is:

1. A locking retainer for a slidable support that includes a first support member with first locking apertures and a second support member with second locking apertures, with the first support member and the second support member slidably engaging each other to define a support profile, the locking retainer comprising:
   a strap that at least partly bounds an internal area that is internal to the strap, and that supports a first locking pin and a second locking pin that extend into the internal area;
   the strap having a locking configuration in which, with the slidable support disposed within the internal area, the first locking pin extends into one of the first locking apertures and one of the second locking apertures to lock the slidable support at a fixed length, the second locking pin extends into another of the first locking apertures and another of the second locking apertures to further lock the slidable support at the fixed length, and the first locking pin is laterally aligned with and axially offset from the second locking pin.

2. The locking retainer of claim 1, wherein the strap includes a first side arm that transitions into a first locking arm, a second side arm that transitions into a second locking arm, and a linking portion that secures the first side arm to the second side arm;
   wherein the first locking pin extends from the first locking arm into the internal area; and
   wherein the second locking pin extends from the second locking arm into the internal area.

3. The locking retainer of claim 2, wherein the strap has a resting configuration, different from the locking configuration, in which the first side arm and the second side arm each extend at an obtuse angle from the linking portion.

4. The locking retainer of claim 1, wherein the strap has a resting configuration in which the first locking pin is laterally offset and axially offset from the second locking pin.

5. The locking retainer of claim 4, wherein the strap is formed as a unitary body.

6. The locking retainer of claim 2, wherein at least part of the linking portion defines a protrusion into the internal area.

7. The locking retainer of claim 6, with the support profile including an opening, wherein, with the strap in the locking configuration and with the slidable support disposed within the internal area, the at least part of the linking portion is configured to extend into the opening in the support profile to internally brace the slidable support.

8. The locking retainer of claim 1 for use with a tool, wherein the first locking pin extends from a first locking arm into the internal area and a tab extends from the first locking arm away from the internal area
wherein, with the strap in the locking configuration, the tab is configured to be engaged with the tool to move the strap out of the locking configuration.

9. The locking retainer of claim 8, wherein the tab is configured as a ramped tab.

10. The locking retainer of claim 8, wherein, with the slidable support disposed within the internal area, the tab is configured to move towards the slidable support to move the strap out of the locking configuration.

11. A locking retainer for a slidable support that includes a first support member with first locking apertures and a second support member with second locking apertures, the first support member and the second support member slidably engaging each other to define a support profile, the locking retainer comprising:
a strap that at least partly bounds an internal area that is internal to the strap and includes:
a first side arm;
a second side arm;
a linking portion connecting the first side arm to the second side arm;
a first locking arm extending from the first side arm opposite the linking portion; and
a second locking arm extending from the second side arm opposite the linking portion;
a first locking pin extending from the first locking arm into the internal area; and
a second locking pin extending from the second locking arm into the internal area;
the strap having a locking configuration in which, with the slidable support within the internal area, the first locking pin extends into one of the first locking apertures and one of the second locking apertures, and the second locking pin extends into another of the first locking apertures and another of the second locking apertures, to lock the slidable support at a fixed length; and
the strap having a resting configuration in which the first side arm and the second side arm each extend at a respective obtuse angle from the l:inkina portion the first locking arm extends at a first acute angle from the first side arm, and the second locking arm extends at a second acute angle from the second side arm.

12. The locking retainer of claim 11, wherein the strap has a staging configuration in which, with the slidable support within the internal area, the first locking pin and the second locking pin are configured to contact the slidable support to flex the first side arm and the second side arm outwardly and hold the strap to the slidable support.

13. The locking retainer of claim 11, wherein, with the strap in the locking configuration, the first locking pin is laterally aligned with and axially offset from the second locking pin; and
wherein, with the strap in the resting configuration, the first locking pin is laterally offset and axially offset from the second locking pin.

14. The locking retainer of claim 11, with the support profile including an opening, wherein, with the strap in the locking configuration and the slidable support disposed within the internal area, at least part of the linking portion is configured to extend into the opening in the support profile to internally brace the slidahle support.

15. A method of installing a locking retainer on a slidable support, the locking retainer having a strap that at least partly bounds an internal area and that includes a first side arm, a first locking arm extending from the first, side arm, and a brace portion, and a first locking pin extending from the first locking arm into the internal area, and the slidable support including a first support member with first locking apertures in an axially-aligned first array and a second support member with second locking apertures in an axially-aligned second array, with the first support member and the second support member slidably engaging each other to define a support profile with a brace opening, the method comprising:
disposing the slidable support within the internal area, including disposing the brace portion of the locking retainer within the opening to internally brace the slidable support;
aligning a first of the first locking apertures with a first of the second locking apertures; and
applying lateral pressure to the first side arm to seat the first locking pin in the first of the first locking apertures and the first of the second locking apertures to lock the slidable support at a fixed length.

16. The method of claim 15, further comprising:
prior to applying lateral pressure to the first side arm to seat the first locking pin in the first of the first locking apertures and the first of the second locking apertures, engaging the first locking pin with the slidable support to flex the first side arm outwardly and hold the strap to the slidable support.

17. The method of claim 15, with the locking retainer including a second locking pin extending into the internal area, the method further comprising:
aligning a second of the first locking apertures with a second of the second locking apertures; and
seating the second locking pin in the second of the first locking apertures and the second of the second locking apertures to further lock the slidable support at the fixed length.

18. The method of claim 17, with the strap further including a second side arm and a second locking arm extending from the second side arm, the second locking pin extending from the second locking arm, the method further comprising:
as part of seating the second locking pin, applying lateral pressure to the second side arm to move the second side arm towards the first side arm.

19. The method of claim 18, wherein the strap includes a linking portion that includes the brace portion and connects the first and second side arms;
wherein the strap has a resting configuration in which the first side arm and the second side arm each extend at a respective obtuse angle from the linking portion, the first locking arm extends at a first acute angle from the first side arm, and the second locking arm extends at a second acute angle from the second side arm; and
wherein applying the lateral pressure to the first and second side arms reduces the respective obtuse angles to substantially right angles and increases the first and second acute angles to substantially right angles.

20. The method of claim 17, further comprising:
as part of seating the first and second locking pins, moving at least one of the first and second locking pins so that the first locking pin is laterally aligned with and axially offset from the second locking pin.

* * * * *